(12) United States Patent
Kwak et al.

(10) Patent No.: US 11,368,945 B2
(45) Date of Patent: Jun. 21, 2022

(54) METHOD FOR RECEIVING DOWNLINK CONTROL CHANNEL IN WIRELESS COMMUNICATION SYSTEM AND APPARATUS THEREFOR

(71) Applicant: LG Electronics Inc., Seoul (KR)

(72) Inventors: Kyuhwan Kwak, Seoul (KR); Seungmin Lee, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 16/647,800

(22) PCT Filed: Sep. 18, 2018

(86) PCT No.: PCT/KR2018/010991
§ 371 (c)(1),
(2) Date: Mar. 16, 2020

(87) PCT Pub. No.: WO2019/054848
PCT Pub. Date: Mar. 21, 2019

(65) Prior Publication Data
US 2020/0280967 A1    Sep. 3, 2020

Related U.S. Application Data

(60) Provisional application No. 62/635,570, filed on Feb. 27, 2018, provisional application No. 62/581,024, (Continued)

(51) Int. Cl.
*H04W 72/12* (2009.01)
*H04W 72/04* (2009.01)
*H04L 5/00* (2006.01)

(52) U.S. Cl.
CPC ......... *H04W 72/042* (2013.01); *H04L 5/0048* (2013.01); *H04L 5/0053* (2013.01); *H04L 5/0082* (2013.01); *H04W 72/1273* (2013.01)

(58) Field of Classification Search
CPC ... H04W 72/04; H04W 72/12; H04W 72/042; H04W 72/1273; H04L 5/00; H04L 5/0048; H04L 5/0053
See application file for complete search history.

(56) References Cited

U.S. PATENT DOCUMENTS

2014/0219202 A1\* 8/2014 Kim .................. H04W 72/0413
370/329
2014/0226591 A1\* 8/2014 Han ....................... H04J 13/16
370/329

(Continued)

FOREIGN PATENT DOCUMENTS

WO   WO2012109542   8/2012

OTHER PUBLICATIONS

Huawei, "Summary of email discussion [89-05] on search space for sTTI operation," R1-1714163, 3GPP TSG RAN WG1 Meeting #90, Prague, Czech Republic, dated Aug. 21-25, 2017, 13 pages.

(Continued)

*Primary Examiner* — Chi Ho A Lee
(74) *Attorney, Agent, or Firm* — Fish & Richardson P.C.

(57) ABSTRACT

The present invention may provide a method for receiving a physical downlink control channel (PDCCH) by a terminal in a wireless communication system, the method comprising: receiving at least one piece of parameter information for acquisition of a control channel element (CCE) index corresponding to a candidate PDCCH, and period information on at least one period during which a configuration related to each of the at least one piece of parameter information is maintained; acquiring the CCE index, using an identical parameter based on each of the at least one piece of parameter information, for each of the at least one period; and receiving the PDCCH by monitoring the candidate PDCCH on the basis of the CCE index.

9 Claims, 11 Drawing Sheets

Related U.S. Application Data filed on Nov. 2, 2017, provisional application No. 62/561,212, filed on Sep. 21, 2017, provisional application No. 62/560,604, filed on Sep. 19, 2017, provisional application No. 62/560,160, filed on Sep. 18, 2017.

(56) References Cited

U.S. PATENT DOCUMENTS

| | | | |
|---|---|---|---|
| 2015/0036618 A1* | 2/2015 | Xu | H04L 5/0053 370/329 |
| 2017/0195028 A1* | 7/2017 | Shimezawa | H04L 1/0026 |
| 2017/0332377 A1* | 11/2017 | Tseng | H04W 72/0413 |
| 2018/0049168 A1* | 2/2018 | Ryu | H04L 5/00 |
| 2018/0227088 A1* | 8/2018 | Bhattad | H04L 5/16 |
| 2018/0227156 A1* | 8/2018 | Papasakellariou | H04W 72/0453 |
| 2018/0332505 A1* | 11/2018 | Kim | H04L 5/0053 |
| 2018/0367283 A1* | 12/2018 | Huang | H04L 5/0094 |
| 2019/0089486 A1* | 3/2019 | Kim | H04L 1/0038 |
| 2019/0393992 A1* | 12/2019 | Xiong | H04L 5/0007 |

OTHER PUBLICATIONS

Intel Corporation, "Search space for shortened DL control channels," R1-1712472, 3GPP TSG-RAN WG1 #90, Prague, Czechia, dated Aug. 21-25, 2017, 5 pages.

LG Electronics, "Discussions on sPDSCH and DMRS design," R1-1611777, 3GPP TSG RAN WG1 Meeting #87, Reno, USA, dated Nov. 14-18, 2016, 6 pages.

PCT International Search Report in International Application No. PCT/KR2018/010991, dated Jan. 2, 2019, 20 pages (with English translation).

Qualcomm Incorporated, "Search Space Design for sTTI Operation," R1-1712780, 3GPP TSG RAN WG1 #90, Prague, Czech Republic, dated Aug. 21-25, 2017, 10 pages.

Qualcomm Incorporated, "sPDCCH Design for Shortened TTI," R1-1712779, 3GPP TSG RAN WG1 #90, Prague, Czech Republic, dated Aug. 21-25, 2017, 12 pages.

EP Extended European Search Report in European Appln. No. 18855509.8, dated Mar. 18, 2021, 9 pages.

* cited by examiner (A) CONTROL-PLANE PROTOCOL STACK (B) USER-PLANE PROTOCOL STACK (a) 1TX or 2TX (b) 4 TX (a)

| 0 | Not used |
|---|---|
| 1 | Not used |
| 2 | 15 |
| 3 | 14 |
| 4 | 13 |
| 5 | 12 |
| 6 | 11 |
| 7 | 10 |
| 8 | 9 |

| 0 | 19 |
|---|---|
| 1 | 18 |
| 2 | 17 |
| 3 | 16 |
| 4 | 15 |
| 5 | 14 |
| 6 | 13 |
| 7 | 12 |
| 8 | 11 |
| 9 | 10 |

2-Symbol CRS-Based RB set (a)     (b)

METHOD FOR RECEIVING DOWNLINK CONTROL CHANNEL IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/010991, filed on Sep. 18, 2018, which claims the benefit of U.S. Provisional Application No. 62/635,570, filed on Feb. 27, 2018, U.S. Provisional Application No. 62/581,024, filed on Nov. 2, 2017, U.S. Provisional Application No. 62/561,212, filed on Sep. 21, 2017, U.S. Provisional Application No. 62/560,604, filed on Sep. 19, 2017, and U.S. Provisional Application No. 62/560,160, filed on Sep. 18, 2017. The disclosures of the prior applications are incorporated by reference in their entirety.

TECHNICAL FIELD

The present disclosure relates to a method of receiving a downlink control channel and an apparatus therefor and, more particularly, to a method of configuring a resource block set for receiving a downlink control channel and an apparatus therefor.

BACKGROUND ART

As more and more communication devices demand greater communication traffic as times go by, the next generation 5G system, which is wireless broadband communication, is being required over the existing LTE systems. In the next generation 5G system named New RAT, communication scenarios are classified into Enhanced Mobile Broadband (eMBB), Ultra-reliability and low-latency communication (URLLC), Massive Machine-Type Communications (mMTC), etc.

Here, eMBB is the next generation mobile communication scenario having such properties as high spectrum efficiency, high user experienced data rate, high peak data rate and the like, URLLC is the next generation mobile communication scenario having such properties as ultra-reliable, ultra-low latency, ultra high availability and the like (e.g., V2X, emergency service, remote control), and mMTC is the next generation mobile communication scenario having such properties as low cost, low energy, short packet, massive connectivity and the like (e.g., IoT).

DETAILED DESCRIPTION OF THE DISCLOSURE

Technical Problems

The present disclosure provides a method of receiving a downlink control channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of receiving a physical downlink control channel (PDCCH) by a user equipment (UE) in a wireless communication system, including receiving one or more parameter information for acquiring control channel element (CCE) indexes corresponding to candidate PDCCHs and duration information about one or more durations in which a configuration related to each of the one or more parameter information is maintained, acquiring the CCE indexes using same parameter based on each of the one or more parameter information with respect to each duration of the one or more durations, and receiving the PDCCH by monitoring the candidate PDCCHs based on the CCE indexes.

The same parameter may be a parameter value configured by each of the one or more parameter information.

The same parameter may be one of parameter values obtained based on a value included in each of the one or more parameter information within each duration among the one or more durations.

The same parameter may be a parameter value obtained first within the duration among the obtained parameter values.

A unit of the duration may depend on a transmission time interval (TTI) unit for receiving the PDCCH.

The same parameter may be acquired based on the number of UEs for which the same starting CCE index is configured.

Positions of the candidate PDCCHs for the PDCCH, based on reception of the PDCCH based on a first transmission time interval (TTI), may have an interval corresponding to an offset configured by a base station (BS) from positions of the candidate PDCCHs based on a second TTI longer than the first TTI.

The method may further include configuring a reference signal bundling size for the PDCCH, and the reference signal bundling size for the PDCCH may be equal to a reference signal bundling size for a physical downlink shared channel (PDSCH).

In another aspect of the present disclosure, provided herein is a user equipment (UE) for receiving a physical downlink control channel (PDCCH) in a wireless communication system, including a transceiver configured to transmit and receive signals to and from a base station (BS), and a processor configured to control the transceiver, wherein the processor may control the transceiver to receive one or more parameter information for acquiring control channel element (CCE) indexes corresponding to candidate PDCCHs and duration information about one or more durations in which a configuration related to each of the one or more parameter information is maintained, acquire the CCE indexes using same parameter based on each of the one or more parameter information with respect to each duration of the one or more durations, and control the transceiver to receive the PDCCH by monitoring the candidate PDCCHs based on the CCE indexes.

The same parameter may be a parameter value configured by each of the one or more parameter information.

The same parameter may be one of parameter values obtained based on a value included in each of the one or more parameter information within each duration among the one or more durations.

The same parameter may be a parameter value obtained first within the duration among the obtained parameter values.

A unit of the duration may depend on a transmission time interval (TTI) unit for receiving the PDCCH.

The same parameter may be acquired based on the number of UEs for which the same starting CCE index is configured.

Positions of the candidate PDCCHs for the PDCCH, based on reception of the PDCCH based on a first transmission time interval (TTI), may have an interval corresponding to an offset configured by the BS from positions of the candidate PDCCHs based on a second TTI longer than the first TTI.

Advantageous Effects

According to the present disclosure, a resource block set for receiving a downlink control channel in a communication system based on a short transmission time interval (sTTI) may be efficiently configured.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF DRAWINGS

FIG. 10 illustrates a method of allocating a resource block for a PDCCH according to an embodiment of the present disclosure.

BEST MODE FOR CARRYING OUT THE DISCLOSURE

Figure 1:
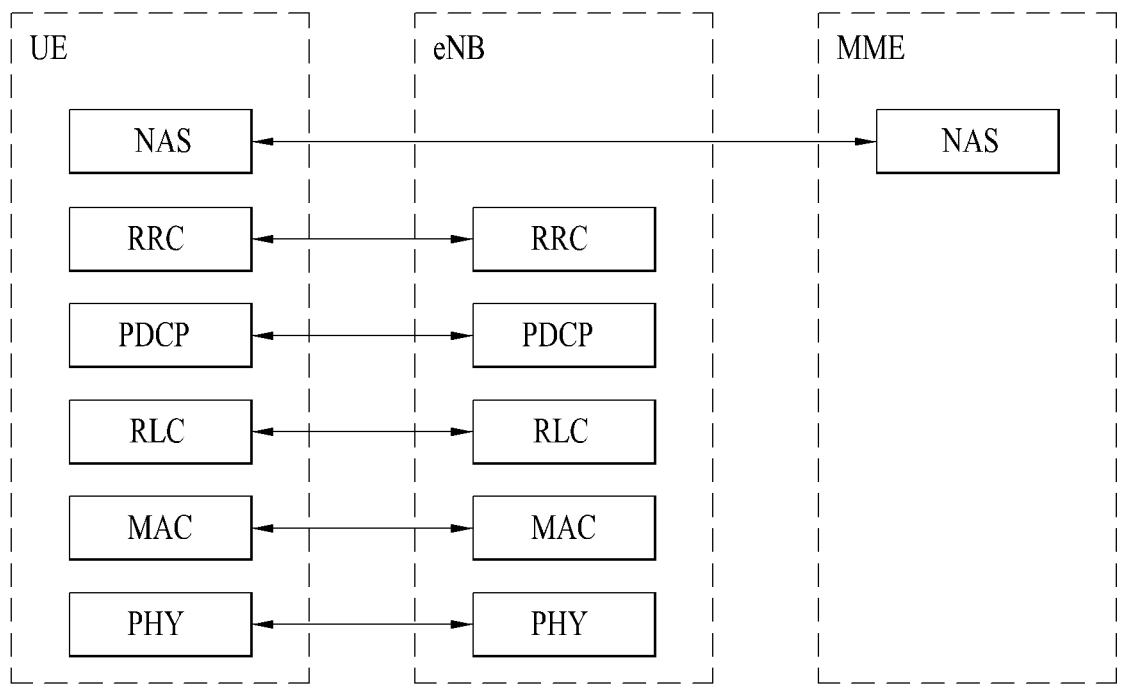
FIG. 1 is a diagram illustrating structures of a control plane and a user plane of a radio interface protocol between a UE and an E-UTRAN based on the 3GPP radio access network specification.
Figure 1:
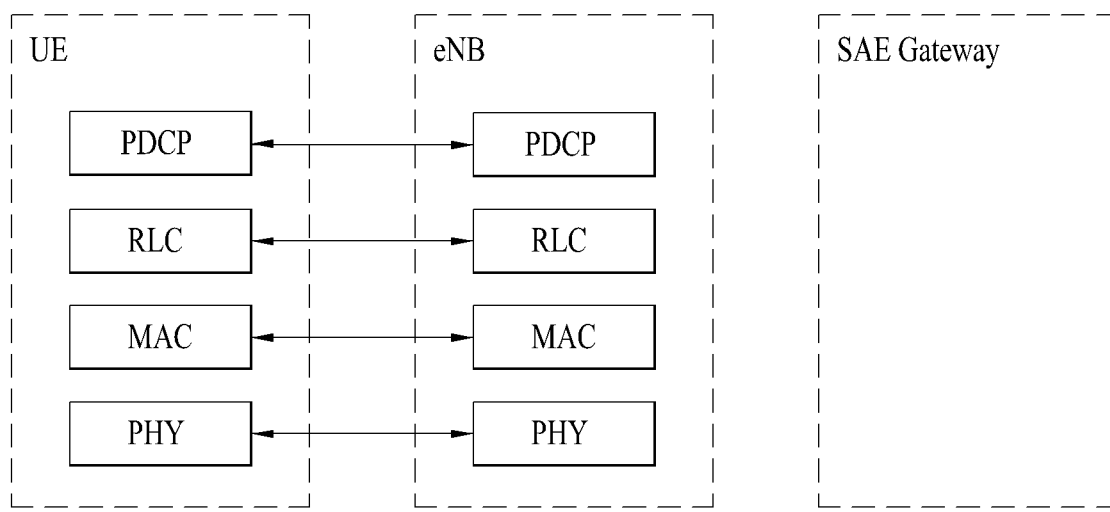

Hereinafter, the structures, operations, and other features of the present disclosure will be understood readily from the embodiments of the present disclosure, examples of which are described with reference to the accompanying drawings. The embodiments which will be described below are examples in which the technical features of the present disclosure are applied to a 3GPP system.

Although the embodiments of the present disclosure will be described based on an LTE system and an LTE-Advanced (LTE-A) system, the LTE system and the LTE-A system are only exemplary and the embodiments of the present disclosure may be applied to all communication systems corresponding to the aforementioned definition.

In the present disclosure, a base station (eNB) may be used as a broad meaning including a remote radio head (RRH), an eNB, a transmission point (TP), a reception point (RP), a relay, etc.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs.

The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 2:
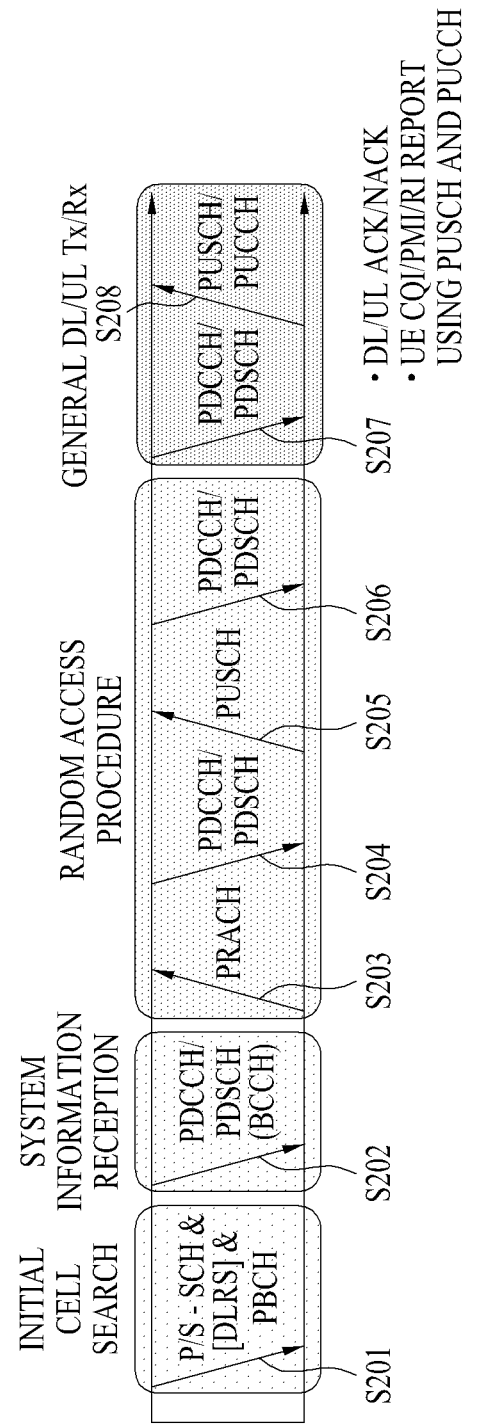
FIG. 2 is a diagram illustrating physical channels used in a 3GPP system and a general signal transmission method using the same.

FIG. 2 is a view illustrating physical channels used in a 3GPP system and a general signal transmission method using the same.

A UE performs initial cell search such as establishment of synchronization with an eNB when power is turned on or the UE enters a new cell (step S201). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S202).

Meanwhile, if the UE initially accesses the eNB or if radio resources for signal transmission are not present, the UE may perform a random access procedure (steps S203 to S206) with respect to the eNB. To this end, the UE may transmit a specific sequence through a Physical Random Access Channel (PRACH) as a preamble (steps S203 and S205), and receive a response message to the preamble through the PDCCH and the PDSCH corresponding thereto (steps S204 and S206). In the case of a contention-based RACH, a contention resolution procedure may be additionally performed.

The UE which performs the above procedures may receive a PDCCH/PDSCH (step S207) and transmit a Physical Uplink Shared Channel (PUSCH)/Physical Uplink Control Channel (PUCCH) (step S208) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink acknowledgment/Negative-acknowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 3:
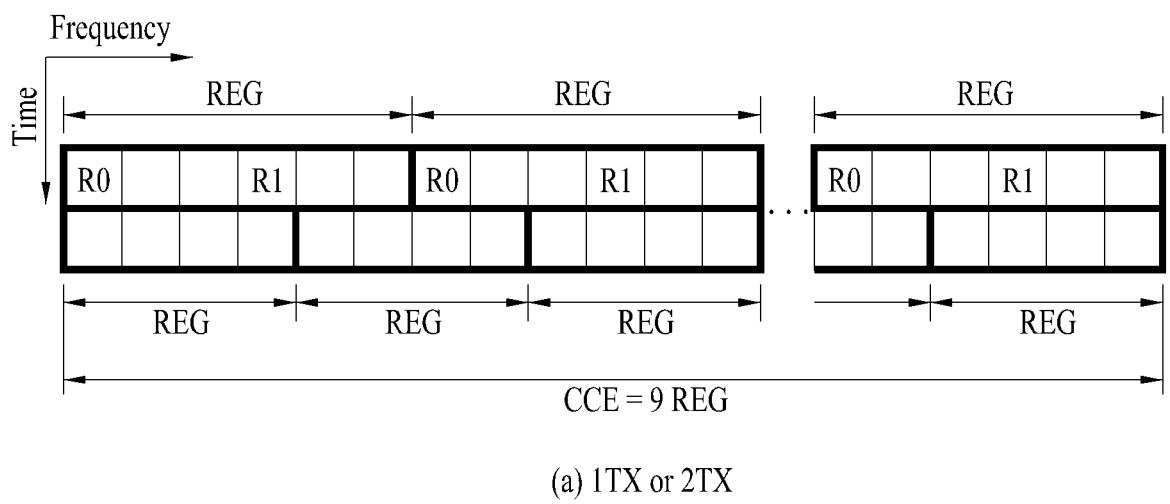
FIG. 3 illustrates a resource unit used to configure a downlink control channel in an LTE system.
Figure 3:
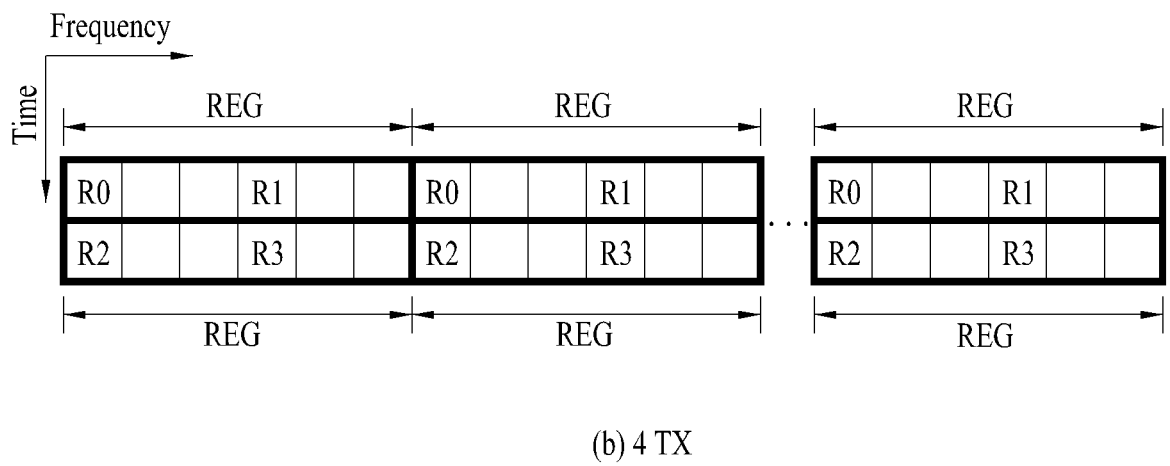

FIG. 3 illustrates a resource unit used to configure a DL control channel in an LTE system. Specifically, FIG. 3(a) illustrates the case in which the number of transmit antennas of the eNB is one or two and FIG. 3(b) illustrates the case in which the number of transmit antennas of the eNB is four. Only reference signal (RS) patterns differ according to the number of transmit antennas and resource units regarding control channels are configured in the same manner.

Referring to FIG. 3, a basic resource unit for a DL control channel is a resource element group (REG). The REG includes 4 adjacent REs, except RSs. REGs are marked by bold lines in the drawings. A PCFICH and a PHICH include 4 REGs and 3 REGs, respectively. A PDCCH is configured in units of a control channel element (CCE) and one CCE includes 9 REGs.

To confirm whether a PDCCH including L CCEs is transmitted to the UE, the UE is configured to monitor $M^{(L)}$ (≥L) contiguous CCEs or $M^{(L)}$ (≥L) CCEs arranged according to a specific rule. A plurality of L values may be considered by the UE to receive the PDCCH. CCE sets that the UE should monitor for PDCCH reception are referred to as a search space. For instance, the LTE system defines the search space as shown in Table 1.

TABLE 1

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Here, a CCE aggregation level L indicates the number of CCEs constituting the PDCCH, $S_k^{(L)}$ indicates a search space with the CCE aggregation level L, and $M^{(L)}$ indicates the number of PDCCH candidates to be monitored in the search space with the aggregation level L.

Search spaces may be categorized into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4 and 8. The common search spaces may overlap with the UE-specific search spaces.

For each CCE aggregation level, the position of the first CCE (a CCE having the smallest index) in a PDCCH search space allocated to an arbitrary UE differ between subframes according to UEs. This is referred to as PDCCH search space hashing.

The CCE may be distributed across a system band. More specifically, a plurality of logically contiguous CCEs may be input to an interleaver and the interleaver may permute the input CCEs on an REG basis. Therefore, frequency/time resources of one CCE are physically distributed across a total frequency/time region within a control region of a subframe. As a control channel is configured in units of a CCE but interleaved in units of an REG, frequency diversity gain and interference randomization gain may be maximized.

<OFDM Numerology>

The new RAT system uses an OFDM transmission scheme or a transmission scheme similar thereto. The new RAT system may use OFDM parameters different from those of LTE. Alternatively, the new RAT system may follow the numerology of legacy LTE/LTE-A but have a larger system bandwidth (e.g., 100 MHz). Further, one cell may support a plurality of numerologies. That is, UEs operating based on different numerologies may coexist within one cell.

<Subframe Structure>

In the 3GPP LTE/LTE-A system, a radio frame has a length of 10 ms (307200 Ts) and includes 10 subframes (SFs) with the same size. All of the 10 SFs in one radio frame may be numbered. Here, Ts denotes a sampling time and is expressed as Ts=1/(2048*15 kHz). Each SF has a length of 1 ms and includes two slots. All of the 20 slots in one radio frame may be sequentially numbered from 0 to 19, and each slot has a length of 0.5 ms. The time required to transmit one SF is defined as a transmission time interval (TTI). Time resources may be distinguished by a radio frame number (or radio frame index), an SF number (or SF index), a slot number (or slot index), etc. The TTI refers to an interval for data scheduling. In the current LTE/LTE-A system, the transmission opportunity of a UL or DL grant is present every 1 ms, for example. That is, no multiple UL/DL grant opportunities are given within a time shorter than 1 ms. Accordingly, the TTI is 1 ms in the legacy LTE/LTE-A system.

Figure 4:
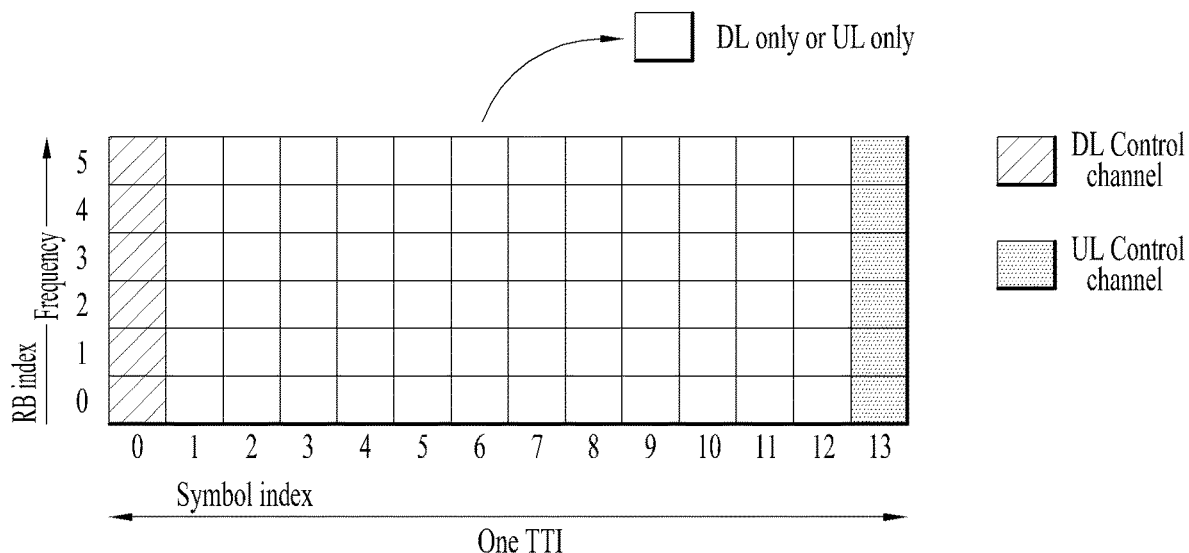
FIG. 4 shows an exemplary slot structure usable for a New Radio access technology (NR).
Figure 4:
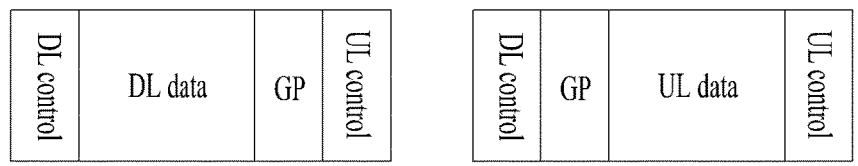

FIG. 4 shows an exemplary slot structure available in new radio access technology (NR).

In order to minimize the delay of data transmission, the NR system considers a slot structure in which a control channel and a data channel are TDMed (time-division-multiplexed).

In FIG. 4(a), the hatched area represents a transmission region of a DL control channel carrying DCI (e.g., PDCCH), and the black area represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 4(a), symbols from symbol index 1 to symbol index 12 may be used to transmit a physical channel carrying DL data (e.g., PDSCH) or transmit a physical channel carrying UL data (e.g., PUSCH). According to the slot structure shown in FIG. 4, since DL transmission and UL transmission are sequentially performed within one slot, transmission/reception of DL data and reception/transmission of a UL ACK/NACK for the DL data may be performed within the one slot. That is, the structure may reduce the time required to retransmit data when a data transmission error occurs, thereby minimizing the latency of final data transmission.

In the slot structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the slot structure.

As shown in FIG. 4(b), when the data region in a slot is used for DL data, the GP may be configured between the DL data region and the UL control channel region. When the data region in the slot is used for UL data, the GP may be configured between the DL control channel region and the UL data region. By doing so, the time gap for switching between the transmission and reception modes may be configured.

In the legacy LTE/LTE-A system, a DL control channel is TDMed with a data channel, and, and the PDCCH, which is a control channel, is distributed and transmitted over the entire system band. However, since it is expected that the bandwidth of a system increases to at least about 100 MHz in the new RAT, it may be less feasible to transmit a control channel over the entire band.

If the UE monitors the entire band to receive a DL control channel for the purpose of data transmission/reception, it may increase the battery consumption of the UE and degrade the efficiency thereof. Thus, the present disclosure proposes to transmit a DL control channel by localizing or distributing the DL control channel to or over a partial frequency band of the system band, i.e., channel band.

In the NR system, the basic transmission unit is a slot. The duration of the slot may be configured with 14 symbols having a normal cyclic prefix (CP) or 12 symbols having an extended CP. The slot is a function of a used subcarrier spacing and scaled by time. That is, as the subcarrier spacing increases, the length of the slot decreases. For example, assuming that the number of symbols per slot is 14, if the number of slots in a 10 ms frame is 10 for a subcarrier spacing of 15 kHz, the number of slots increases to 20 for a subcarrier spacing of 30 kHz and 40 for a subcarrier spacing of 60 kHz. As the subcarrier spacing increases, the length of an OFDM symbol decreases. The number of OFDM symbols in the slot varies depending on whether the normal CP or extended CP is used but does not change depending on the subcarrier spacing. The basic time unit for LTE, Ts is defined as Ts=1/(15000*2048) seconds in consideration of a basic subcarrier spacing of 15 kHz and a maximum FFT size of 2048 in the LTE. The basic time unit Ts is also used as a sampling time for the 15 kHz subcarrier spacing. In the NR system, various subcarrier spacings including the 15 kHz subcarrier spacing are available, and since the subcarrier spacing is inversely proportional to a corresponding time length, the actual sampling time for subcarrier spacings larger than 15 kHz becomes shorter than Ts=1/(15000*2048) seconds. For example, the actual sampling time for subcarrier spacings of 30 kHz, 60 kHz, and 120 kHz may be 1/(2*15000*2048) seconds, 1/(4*15000*2048) seconds, and 1/(8*15000*2048) seconds, respectively.

<Analog Beamforming>

A fifth-generation (5G) mobile communication system under discussion is considering the use of an ultra-high frequency band, that is, a millimeter frequency band equal to or higher than 6 GHz in order to transmit data to a plurality of users in a wide frequency band while maintaining a high transmission rate. In 3GPP, this technology is called "NR", and thus the 5G mobile communication system is referred to as the NR system in the present disclosure. However, the millimeter frequency band has the following frequency characteristics: a signal is rapidly attenuated depending on distance due to the use of too high a frequency band. Therefore, the NR system using a frequency band equal to or higher than 6 GHz employs a narrow beam transmission scheme in which signal transmission is performed based on energy concentration in a specific direction rather than omni-directionally to compensate for rapid propagation attenuation and thus overcome the decrease in coverage caused by the rapid propagation attenuation. However, if a service is provided using only one narrow beam, the coverage of a base station (or gNB) decreases, and thus the base station provides the service in a wideband by collecting a plurality of narrow beams.

In the millimeter frequency band, that is, millimeter wave (mmW) band, since a wavelength is shortened, a plurality of antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW, the coverage or throughput may be improved by increasing the beamforming gain using multiple antenna elements.

To create a narrow beam in the millimeter frequency band, a beamforming method is mainly considered. According to the beamforming method, the base station or UE transmits the same signals with appropriate phase differences through multiple antennas to thereby increase energy only in a specific direction. Beamforming methods include digital beamforming for creating a phase difference between digital baseband signals, analog beamforming for creating a phase difference between modulated analog signals based on time delays (i.e., cyclic shifts), and hybrid beamforming using both the digital beamforming and analog beamforming. If a transceiver unit (TXRU) is provided to each antenna element to enable adjustment of transmit power and phase per antenna element, beamforming may be performed independently for each frequency resource. However, installing TXRUs in all of the about 100 antenna elements is less feasible in terms of cost. That is, considering that multiple antennas needs to be used to compensate for the rapid propagation attenuation in the millimeter frequency band, and the digital beamforming requires as many RF components (e.g., digital to analog converters (DACs), mixers, power amplifiers, and linear amplifiers) as the number of antennas, the implementation of the digital beamforming in the millimeter frequency band faces the following problem: the cost of communication devices increases. Therefore, when a large number of antennas are required as in the millimeter frequency band, the analog beamforming or the hybrid beamforming is considered. In the analog beamforming, multiple antenna elements are mapped to one TXRU, and the direction of a beam is controlled by an analog phase shifter. However, the analog beamforming is disadvantageous in that frequency selective beamforming (BF) is not provided because only one beam direction is generated over the entire band. As an intermediate form between the digital BF and analog BF, the hybrid BF has B TXRUs fewer than Q antenna elements. In the case of the hybrid BF, the directions of beams transmittable at the same time is limited to B or less although the number of beam directions depends on how B TXRUs and Q antenna elements are connected.

Figure 5:
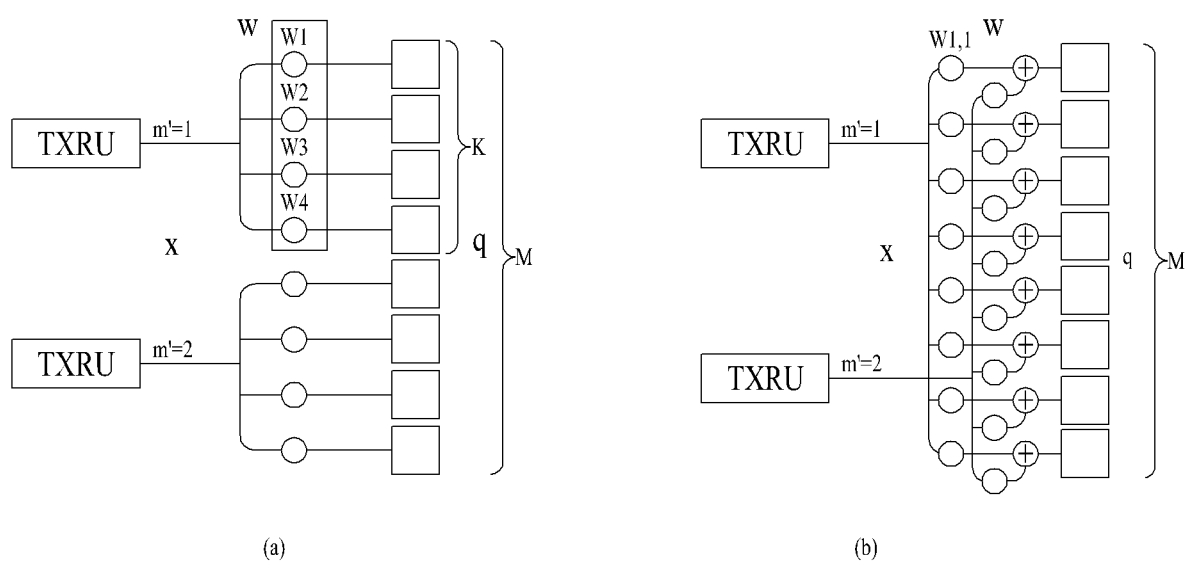
FIG. 5 illustrates examples of a connection mode of TXRU and an antenna element.

FIG. 5 illustrates methods for connecting a TXRU to an antenna element.

Specifically, FIG. 5(a) illustrates a connection between a TXRU and a sub-array. In this case, the antenna element is connected only to one TXRU. In contrast, FIG. 5(b) illustrates a connection between a TXRU and all antenna elements. In this case, the antenna element is connected to all TXRUs. In FIG. 5, W denotes a phase vector subjected to multiplication by an analog phase shifter. That is, the analog BF direction is determined by W. Here, the mapping relationship between CSI-RS antenna ports and TXRUs may be a one-to-one or one-to-many relationship.

In the digital BF, since a digital baseband signal to be transmitted or a received digital baseband signal is signal-processed, signals may be transmitted or received simultaneously in multiple directions using multiple beams as described above. In contrast, in the analog BF, since an analog signal to be transmitted or a received analog signal is beamformed after being modulated, signals may not be transmitted or received simultaneously in multiple directions beyond the coverage of one beam. Typically, the base station communicates with multiple users at the same time based on the wideband transmission or multi-antenna characteristics. If the base station uses the analog BF or hybrid BF and forms an analog beam in one beam direction, the gNB has no other way than to communicate only with users located along the same analog beam direction due to the feature of the analog BF. The RACH resource allocation and resource utilization method for a base station according to the present disclosure, which will be described later, is proposed by considering the restrictions due to the features of the analog or hybrid BF.

<Hybrid Analog Beamforming>

Figure 6:
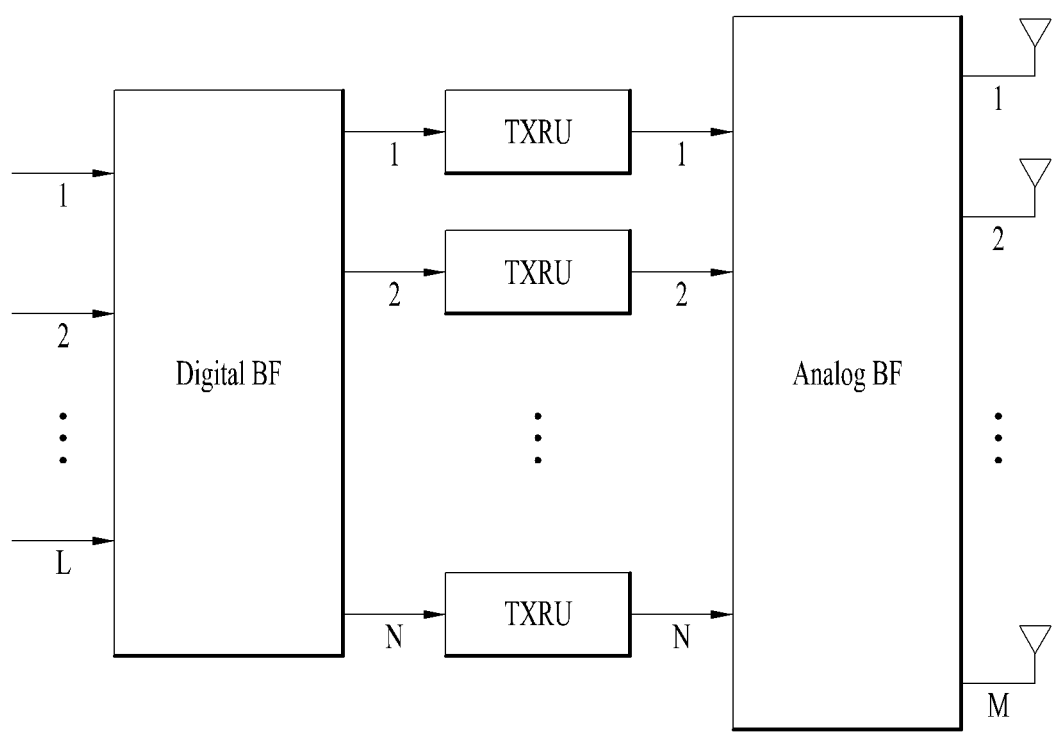
FIG. 6 abstractly shows a hybrid beamforming structure in aspects of Transceiver Unit (TXRU) and physical antenna.

FIG. 6 abstractly illustrates a hybrid beamforming structure in terms of TXRUs and physical antennas.

For a case where multiple antennas are used, the hybrid BF obtained by combining the digital BF and the analog BF has been introduced. The analog BF (or RF BF) is an operation of performing precoding (or combining) in an RF unit. The hybrid BF is advantageous in that it guarantees performance similar to that of the digital BF while reducing the number of RF chains and the number of DACs (or analog to digital converters (ADCs) since precoding (combining) is performed by both a baseband unit and an RF unit. For convenience, a hybrid BF structure may be represented by N TXRUs and M physical antennas. The digital BF for L data layers to be transmitted by a transmission end may be represented as an N-by-N matrix. In addition, N converted digital signals are converted to analog signals through TXRUs and then subjected to the analog BF represented as an M-by-N matrix. In FIG. 6, the number of digital beams is L, and the number of analog beams is N. Further, it is considered in the NR system that the base station is configured to be capable of changing the analog BF on a symbol basis to support more efficient BF for UEs in a specific area. When one antenna panel is defined by N TXRUs and M RF antennas, the introduction of a plurality of antenna panels to which independent hybrid BF is applicable is also considered. When the base station uses a plurality of analog beams, each UE may prefer a different analog beam for signal reception. Therefore, a beam sweeping operation in which for at least an SS, system information, paging, etc., the base station changes a plurality of analog beams on a symbol basis in a specific slot or SF to allow all UEs to have reception opportunities is considered.

Figure 7:
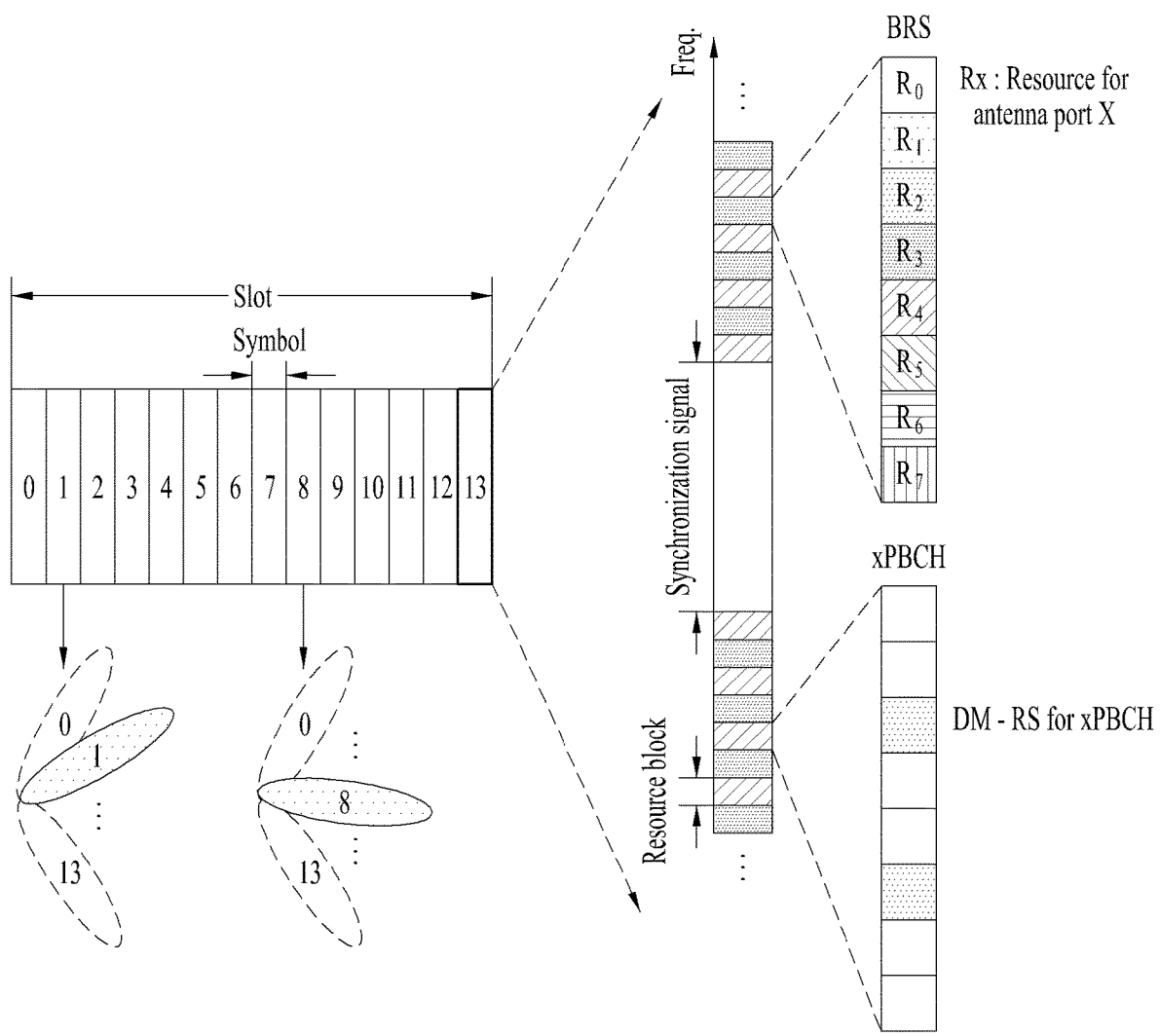
FIG. 7 illustrates beam sweeping operation for a synchronization signal and system information during downlink transmission.

FIG. 7 illustrates beam sweeping operation for an SS and system information during DL transmission. In FIG. 6, a physical resource or channel for broadcasting system information of the NR system is referred to as a physical broadcast channel (xPBCH). Analog beams from different antenna panels may be simultaneously transmitted in one symbol, and the introduction of a beam reference signal (BRS), that is, an RS transmitted for a single analog beam corresponding to a specific antenna panel as illustrated in FIG. 7 is under discussion to measure a channel per analog beam. The BRS may be defined for a plurality of antenna ports, and each antenna port of the BRS may correspond to a single analog beam. In contrast to the BRS, the SS or xPBCH may be transmitted for all analog beams included in an analog beam group so that any UE may receive the SS or the xPBCH successfully.

Figure 8:
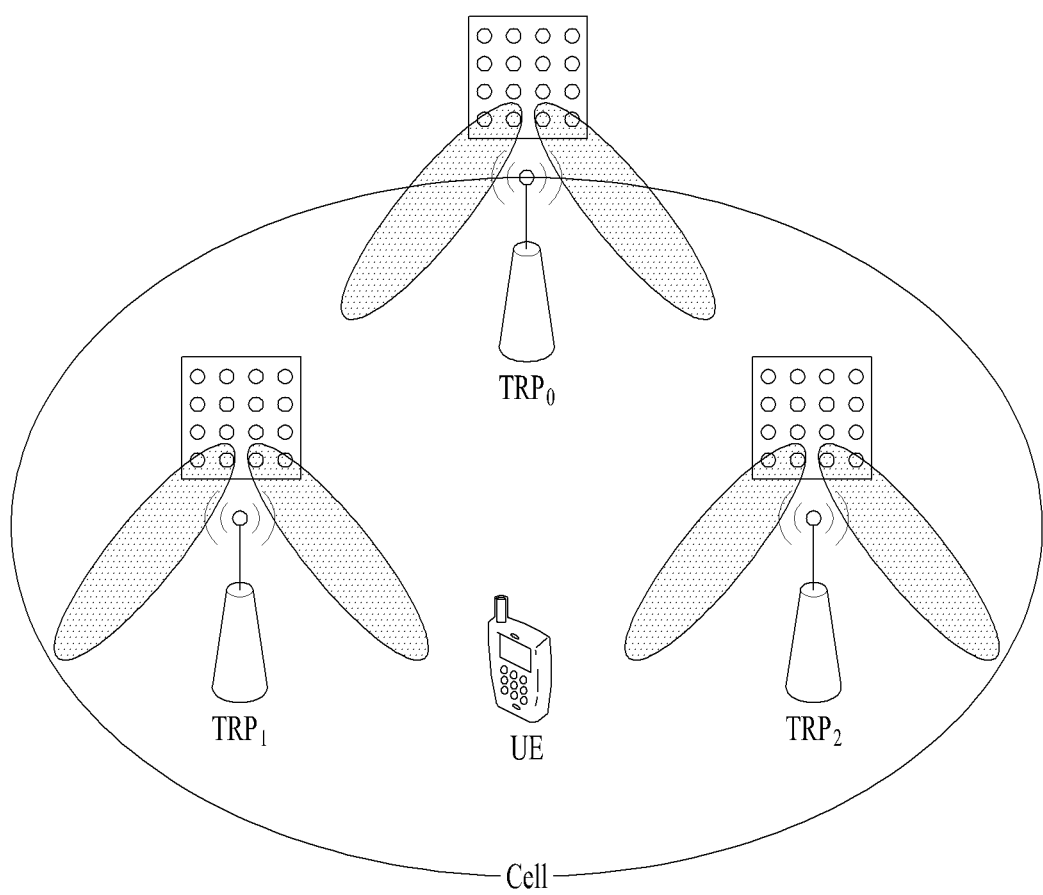
FIG. 8 illustrates a cell of a new radio access technology (NR) system.

FIG. 8 shows an exemplary cell of a New Radio access technology (NR) system.

Referring to FIG. 8, in a NR system, unlike that one BS forms one cell in a wireless communication system such as the existing LTE or the like, a scheme that a plurality of Transmission Reception Points (TRPs) form one cell is under discussion. If a plurality of TRPs form one cell, although a RTP that services a UE is changed, seamless communication is possible. Hence, mobility management of a UE is advantageously facilitated.

In the LTE/LTE-A system, PSS/SSS is transmitted in omni-directions. Unlike this, in the NR system, a following method is considered. Namely, a gNB applying mmWave performs a beamforming on a signal such as PSS, SSS, PBCH or the like by turning a direction of a beam omni-directionally and then transmits the corresponding signal. In doing so, transceiving a signal by turning a beam direction is referred to as a beam sweeping or a beam scanning. In the present disclosure, 'beam sweeping' indicates an operation of a transmitter side and 'beam scanning' indicates an operation of a receiver side. For example, assuming that a gNB is capable of having maximum N beam directions, the gNB transmits signals of PSS/SSS/PBCH and the like in the N beam directions, respectively. Namely, the gNB transmits synchronization signals of PSS/SSS/PBCH and the like in the respective directions. Or, if the gNB is capable of forming N beams, a plurality of beams may be bundled into a single beam group and PSS/SSS/PBCH may be transmitted and received per beam group. In this case, one beam group includes one or more beams. A signal of PSS/SSS/PBCH or the like transmitted in the same direction may be defined as one SS block and a plurality of SS blocks may exist within a cell. In case that a plurality of SS blocks exist, an SS block index may be used to identify each SS block. For example, when PSS/SSS/PBCH is transmitted in 10 beam directions in a single system, PSS/SSS/PBCH in the same direction may configure one SS block and 10 SS blocks may be understood as existing in the corresponding system. In the present disclosure, a beam index may be interpreted as an SS block index.

Now, a method of configuring a resource block (RB) set for transmitting a DL control channel according to an embodiment of the present disclosure will be described.

In a next-generation communication system, i.e., 5G New RAT, methods of shortening latency upon transmitting and receiving signals are under consideration. To this end, a structure of shortening a transmission time interval (TTI) is considered. In this case, it is necessary to newly invent data and control information transport channels for a short TTI. Accordingly, the present disclosure proposes a new configuration method capable of efficiently using an RB set configured upon transmitting DL control information in a next-generation communication system having the short TTI.

In a legacy LTE system, one or more symbols arranged in a front part of a subframe of a 1 ms length are configured as a physical downlink control channel (PDCCH) and the gNB transmits downlink control information (DCI) through the PDCCH.

When the DCI is transmitted through the PDCCH, a plurality of aggregation levels (ALs) is configured, so that one or more CCEs may be aggregated according to a channel state, and the UE attempts to decode the DCI through blind decoding (BD) according to an AL.

If the structure with the short TTI, which is shorter than 1 ms of a TTI of the legacy LTE system, is introduced as described above, it is necessary to consider a method of transmitting the DCI in a communication environment in which the DCI is transmitted in units of the short TTI. In the present disclosure, although a description is given for convenience under the assumption that subframes configured by the short TTI (sTTI) less than 1 ms coexist, the present disclosure is not limited thereto. That is, the contents of the present disclosure may be applied to an environment in which TTIs of different lengths coexist.

In the present disclosure, a DL control channel and DL control information transmitted in units of a long TTI are referred to as a PDCCH and DCI, respectively, and a DL control channel and DL control information transmitted in units of a short TTI are referred to as a short PDCCH (sPDCCH) and short DCI (sDCI), respectively. Here, the sDCI may be transmitted in a PDCCH region and/or a short PDCCH (sPDCCH) region, and the sPDCCH may be configured in units of a short CCE (sCCE) including a plurality of short REGs (sREGs).

An enhanced PDCCH (EPDCCH) of the legacy LTE system may configure a maximum of two RB sets and transmit BD candidates per AL by applying a predefined value according to the size of an RB set.

When an RB set is configured in an sTTI environment, not only an RB set which is included in a search space of the UE and thus is to be monitored but also an RB set which is not included in the search space of the UE so that the RB set is not to be monitored and is not included even in search spaces of other UEs may be configured for the UE.

When the RB set which is to be monitored and the RB set which is not to be monitored are configured together as described above, an indication related to resources on which control information is not transmitted in the RB sets, i.e., unused resources in the RB sets, according to a multiplexing scheme between a control channel and a data channel may be transmitted through the DCI and/or the sDCI, thereby raising resource use efficiency.

In order to effectively perform the above-described operation, the gNB may configure a region in which control information of each UE is transmitted. For example, the gNB may designate a starting sCCE index through higher layer signaling and/or physical layer signaling.

Specifically, in order to configure the starting sCCE index through higher layer signaling, the gNB may configure an additional radio network temporary identifier (RNTI) or a value corresponding to the RNTI for the UE and apply the additional RNTI or the value corresponding to the RNTI to a hashing function for determining a search space. For example, upon determining the value of $Y_k$ in a hashing function of a legacy PDCCH as indicated in Equation 1 below, the additional RNTI configured through a higher layer or the value corresponding to the RNTI may be applied and then the starting sCCE index may be derived.

$$\{(Y_k+m') \bmod \lfloor N_{CCE,k}/L \rfloor\}+i \qquad \text{[Equation 1]}$$

As a related embodiment, in the legacy PDCCH, Equation 2 for calculating $Y_k$ may be defined.

$$Y_k=(A \cdot Y_{k-1}) \bmod D \qquad \text{[Equation 2]}$$

Here, $Y_{-1}=n_{RNTI} \neq 0$, A=39827 D=65537, and k=$\lfloor n_s/2 \rfloor$ where $n_s$ denotes a slot number in a radio frame.

In the above equation for calculating $Y_k$, the additional RNTI configured through the higher layer or the value corresponding to the RNTI may be substituted for $Y_{-1}$ to determine the starting sCCE index of the UE. In this case, an sTTI index or a subframe index may be applied to $n_s$ in consideration of inter-cell interference (ICI). The value of A and/or D may be configured by the gNB for the UE through higher layer signaling and/or physical layer signaling.

The additional RNTI or the value corresponding to the RNTI may be configured per sTTI index or per sTTI index group. For example, a different RNTI value may be configured per sTTI index group distinguished according to whether a CRS is present or a different RNTI value may be configured per sTTI index group distinguished according to the length of an sTTI. In addition, a different RNTI value may be configured according to whether a subframe is a multicast broadcast single frequency network (MBSFN) subframe or a non-MBSFN subframe or a different RNTI value may be configured according to whether transmission is CRS-based control channel RB set transmission or DMRS-based control channel RB set transmission.

Further, a different RNTI value may be configured according to whether an RB set allocation type is a distributed type or a localized type. A different RNTI value may be configured according to whether a region in which the control information is transmitted is a PDCCH region or an sPDCCH region. A different RNTI value may be configured according to whether a subframe in which the control information is transmitted is a special subframe or a normal subframe. A different RNTI value may be configured according to whether a duplex scheme is TDD or FDD. In addition, a different RNTI value may be configured according to whether a search space is a common search space (CSS) or a UE-specific search space (USS). A different RNTI value may be configured per DCI format and a different RNTI value may be configured according to whether the DCI format is a transmission mode (TM) dependent DCI format or a fallback DCI format.

When different RNTI values are configured, the values may be individually configured or two different values may be determined by configuring one value of the different RNTI values and an additional offset value. The above-described methods of configuring the RNTI values may be limitedly applied to a specific TM or a specific cell (e.g., primary cell (PCell)) or may be commonly applied.

In order to determine the starting sCCE index, when the additional RNTI configured by the gNB for the UE or the value corresponding to the RNTI is applied to $Y_k$ of the hashing function, a modulo operation such as ($Y_k$ mod X) may be applied instead of $Y_k$ so that multiple UEs may have the same starting sCCE index. In this case, the value of X may be configured through higher layer signaling and/or physical layer signaling in consideration of the number of UEs for which the starting sCCE index is equally configured or may be predefined in a system.

In order to configure the starting CCE index for the UE through higher layer signaling and/or physical layer signaling, the gNB may directly designate $Y_k$ in Equation 1 above or may designate $Y_{-1}$ so that $Y_k$ may be calculated by Equation 2. To this end, the gNB may indicate an additional configuration through higher layer signaling and/or physical layer signaling to indicate whether to directly designate $Y_k$ for the UE or to designate $Y_{-1}$ so that the UE may calculate $Y_k$.

When the gNB designates $Y_{-1}$, the gNB may indicate, together with $Y_{-1}$, a duration in which a configuration for $Y_{-1}$ is maintained to the UE through higher layer signaling and/or physical layer signaling. For example, when the gNB configures the duration in which the configuration is maintained as 5 while configuring $Y_{-1}$, the starting CCE index may be calculated using $Y_0$ with respect to $Y_0$ to $Y_4$ and using $Y_5$ with respect to $Y_5$ to $Y_9$. In this case, the unit of the duration in which the configuration is maintained may be variously modified to an sTTI unit or a subframe unit according to definition of the value of k.

In the above-described embodiment, a timing of a reference value applied during the corresponding duration may be designated as any one value within the corresponding duration, without being limited to $Y_k$ which is calculated first within the corresponding duration (i.e., $Y_0$ among $Y_0$ to $Y_4$).

For example, when determining the starting CCE index in the range of $Y_0$ to $Y_4$, it is not necessary to determine the starting CCE index by maintaining $Y_0$ and the starting CCE index may be determined by equally maintaining any one of $Y_0$ to $Y_4$ (e.g., $Y_4$).

Figure 9:
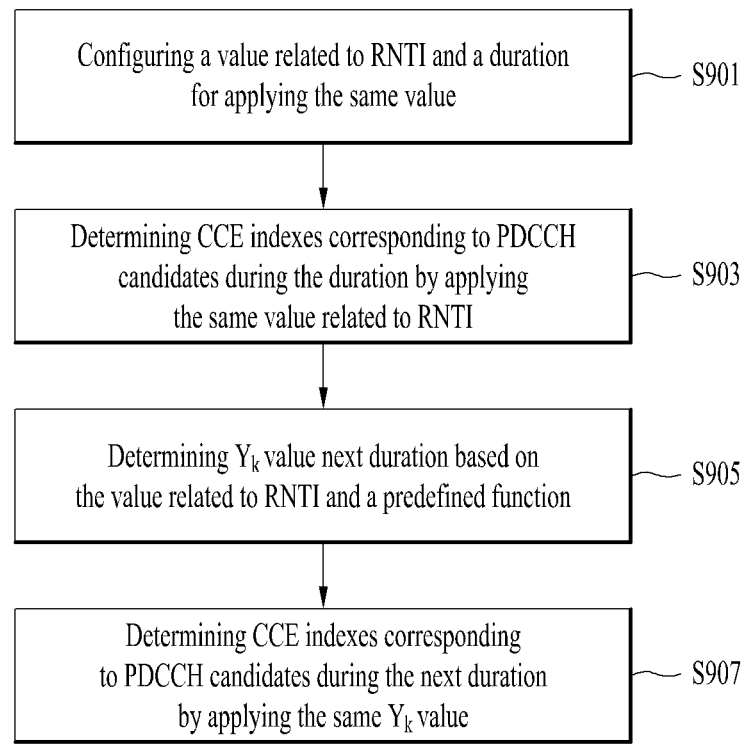
FIG. 9 illustrates a method of determining CCE indexes corresponding to candidate PDCCHs according to an embodiment of the present disclosure.

With regard to the above-described embodiment, referring to FIG. 9, the UE receives the value $Y_{-1}$ related to an RNTI and a duration in which a configuration for $Y_{-1}$ is maintained from the gNB and configures the value $Y_{-1}$ and the duration (S901). The value of $Y_0$ is calculated by substituting the value of $Y_{-1}$ for Equation 2 and CCE indexes are determined by equally applying the calculated value of $Y_0$ during the duration (S903). Next, the UE determines the value of $Y_k$ to be applied to the next duration corresponding to the configured duration (S905) and determines CCE indexes in the next duration using the determined value of $Y_k$ (S907).

If a duration in which the same value of $Y_k$ is maintained is configured through the above-described embodiment, interference randomization may be performed in units of the duration. Similarly, while a plurality of values of $Y_k$ is configured, a plurality of durations to which the respective values of $Y_k$ are applied may be indicated to the UE through higher layer signaling and/or physical layer signaling. Through the above-described method, an operation of multiplexing a control channel and a data channel may be more efficiently performed during a corresponding duration.

In addition to the above-described embodiments, the gNB may directly configure the starting sCCE index through higher layer signaling and/or physical layer signaling without using the hashing function of Equation 1. In this case, a different starting sCCE index may be configured per AL and an interval between sCCEs of each AL may also be configured. Here, an interval between ALs may be configured as an interval between first sCCEs of the first candidates among one or more decoding candidates of respective ALs or may be configured as an interval between the last sCCE of the last BD candidate of a lower AL and the first sCCE of the first BD candidate of a higher AL. In the case of the interval between sCCEs of each AL, one interval value may be equally applied to all sCCEs or respective intervals may be separately configured.

In the present disclosure, when the gNB configures a specific parameter, the parameter value may be separately configured per RB set and/or per AL or may be equally configured regardless of the RB set and the AL.

When the parameter value is differently configured according to a condition or an environment, each value may be individually configured or different values may be configured as one value and an additional offset value. In the present disclosure, although an inventive feature and/or an embodiment may be regarded as one proposed method, combinations of inventive features and/or embodiments may also be regarded as a new proposed method.

When the gNB configures an RB set for control channel transmission, one or more RB sets may be allocated in consideration of RS overhead according to an sTTI index and/or a subframe type, or one or more BD candidate values per AL for an RB set may be allocated. In this case, when a different RB set is configured according to whether a CRS is present in each sTTI index with respect to a DMRS-based sPDCCH RB set in a non-MBSFN subframe, a part or all of RB set configurations in an sTTI without the CRS may be applied to an MBSFN subframe. The RB set configurations which are applicable to the MBSFN subframe may be parameters such as the location of an RB, the number of operations of BD per AL, and/or a starting sCCE index.

In other words, the DMRS-based sPDCCH RB set configured in the non-MBSFN subframe may be applied to the MBSFN subframe. In this case, only a partial parameter such as the BD candidate values per AL may be differently configured.

The total number of RB sets configured in the MBSFN subframe may be configured to be same as the total number of RB sets configured in the non-MBSFN subframe. Specifically, when one CRS-based RB set and one DMRS-based RB set are configured in the non-MBSFN subframe in which the total number of RB sets configured is 2, the gNB may apply a configuration for the DMRS-based RB set to the MBSFN subframe and further configure one additional DMRS-based RB set so that the total number of RB sets configured in the MBSFN subframe may be equal to the total number of RB sets configured in the non-MBSFN subframe.

As another embodiment, if only one CRS-based RB set is configured in the non-MBSFN subframe, only one new DMRS-based RB set may be configured for the MBSFN subframe so that the total number of RB sets applied to the non-MBSFN subframe may be equal to the total number of RB sets applied to the MBSFN subframe. In the above-described example, the DMRS-based RB set of the MBSFN subframe configured instead of the CRS-based RB set of the non-MBSFN subframe may be limited to distributed allocation.

Additionally, if multiple RB sets are configured, an RB set to be monitored may differ according to an sTTI index and/or a subframe type. For example, when a total of 4 RB sets is configured, two DMRS-based RB sets and two CRS-based RB sets may be configured. In addition, the UE may monitor the two CRS-based RB sets in the non-MBSFN subframe and monitor the two DMRS-based RB sets in an sTTI located in a PDSCH region of the MBSFN subframe. The RB set configuration described above may be explicitly indicated by the gNB to the UE through higher layer signaling and/or physical layer signaling or may be implicitly determined. It is apparent that the above-described inventive feature is not limited to the above embodiment.

If a control channel of a TTI defined as a different length from a specific length is included in an sTTI defined as the specific length, the case in which control channel information of the sTTI should be transmitted in the control channel of the TTI. For example, it is assumed that an sTTI defined as two or three symbols and the legacy LTE system coexist. In this case, a legacy PDCCH may be transmitted in the foremost sTTI among a plurality of sTTIs included in a legacy subframe and sDCI may be transmitted in a search space in the legacy PDCCH. Therefore, an operation for indicating the starting sCCE index and/or application or non-application of the operation may be configured to be different between an sTTI including the control channel of the TTI defined as the different length (e.g., legacy subframe) and an sTTI that does not include such control channel through higher layer signaling and/or physical layer signaling or may be predefined. Hashing functions for calculating sCCE indexes applied to the sTTI including the control channel defined as the different length and the sTTI that does not include the control channel may be different. In some cases, the operation for indicating the starting sCCE index and/or application or non-application of the operation, and the hashing function for calculating the sCCE indexes may be equally configured.

Specifically, the operation for indicating the starting sCCE index may be predefined or configured to be applied only to the sTTI that does not include the control channel of the TTI defined as the different length. Alternatively, the operation for indicating the starting sCCE index may be differently configured between or differently applied to the sTTI including the control channel of the TTI defined as the different length and the sTTI that does not include the control channel. In this case, the meaning that the operation for indicating the starting sCCE index is differently configured may represent that configuration values of the sTTI including the control channel of the TTI defined as the different length and the sTTI that does not include the control channel are differently indicated. In addition, the meaning that the operation for indicating the starting sCCE index is differently applied may represent that configuration values of the sTTI including the control channel of the TTI defined as the different length and the sTTI that does not include the control channel may be applied to different hashing functions.

If the operation for indicating the starting sCCE index is applied to the control channel of the TTI defined as the different length, the sTTI including the control channel of the TTI defined as the different length and the sTTI that does not include the control channel of the TTI defined as the different length may differ in definition of an sCCE. For example, the sTTI including the control channel of the TTI defined as the different length may conform to a CCE unit defined in the TTI defined as the different length. Therefore, according to definition of a corresponding channel, the operation may be interpreted as indicating a starting CCE index rather than the starting sCCE index.

In the case of sDCI of an sTTI, if the sTTI includes a control channel on which DCI of the TTI defined as the different length is transmitted, the sDCI may be transmitted in the total number of control channel candidates corresponding to a search space configured in the control channel for DCI transmission. In other words, both the DCI and the sDCI may be transmitted in the control channel candidates corresponding to the search space configured in the control channel for DCI transmission. In this case, a configuration as to in which control channel candidates the sDCI are to be transmitted is needed. This configuration may be indicated by the gNB to the UE through higher layer signaling and/or the physical layer signaling or may be predefined.

In this case, the control channel candidates in which the sDCI is to be transmitted among total control channel candidates or a starting CCE index corresponding to the control channel candidates may be indicated to the UE or may be implicitly predefined. The starting CCE index for sDCI transmission may be directly configured by the gNB or may be calculated by applying Equation 1 and Equation 2 based on the above-described embodiments.

For example, the gNB may indicate an additional RNTI for the sTTI or a value corresponding to the RNTI to the UE and determine the starting CCE index by applying the RNTI or the value corresponding to the RNTI to Equation 1 or a separately designated hashing function.

If the starting CCE index for the search space configured in the control channel for DCI transmission is determined using a predefined hashing function without an additional configuration of the gNB, this may contradict an operation of configuring the starting CCE index by the gNB as described in the above embodiment.

To solve this problem, for DCI in the search space configured in the control channel for DCI transmission, the predefined hashing function may be used as in an existing method to determine the starting CCE index or the control channel candidates corresponding to the starting CCE index and, for the sDCI, the operation of configuring the starting CCE index is used as described in the present disclosure and the predefined hashing function is applied to determine the starting CCE index or the control channel candidates in which the sDCI is transmitted. In other words, the starting CCE index corresponding to DCI transmission may be determined using a starting CCE index calculation method applied to the legacy LTE system and the predefined hashing function, and the starting CCE index corresponding to sDCI transmission may be determined using the above-described starting CCE index calculation method according to the present disclosure and the predefined hashing function.

To this end, N front or rear control channel candidates for sDCI transmission among total control channel candidates may be defined or the number of control channel candidates in which the sDCI may be transmitted and the starting control channel candidate or the starting CCE index may be defined.

That is, the predefined hashing function is used for the search space configured in the control channel for DCI transmission and the number of control channel candidates for each of the DCI and the sDCI is predefined.

In addition, the control channel candidates for sDCI transmission may be additionally configured separately from the total number of control channel candidates predefined in the search space configured in the control channel for DCI transmission. Even in this case, the method of configuring the starting CCE index discussed in the present disclosure may be applied or a position at which the sDCI is transmitted may be predefined.

For example, the control channel candidates for the sDCI may be defined as positions immediately after or immediately before the control channel candidates in the search space for the DCI. Specifically, the existing hashing function is used and the number of control channel candidates is increased so that control channel candidates added from existing control channel candidates may be allocated for sDCI transmission.

The control channel candidates for the sDCI may be defined to be located at positions separated by a specific offset from positions of the control channel candidates in the search space for the DCI. In this case, a control channel candidate which is a reference to apply the offset value among the control channel candidates for the DCI may be the first control channel candidate or the last control channel candidate. Here, the specific offset value may be predefined or may be indicated by the gNB to the UE through higher layer signaling and/or physical layer signaling.

The gNB may configure application or non-application of RS bundling and an RS bundling size on a control channel in each sTTI through higher layer signaling and/or physical layer signaling or configure application or non-application of RS bundling and the RS bundling size on a control channel in an sTTI group classified according to a specific criterion such as an sTTI length or an RS overhead degree through higher layer signaling and/or physical layer signaling.

Application or non-application of RS bundling and/or the RS bundling size in each sTTI or each sTTI group may be equal or different. The RS bundling size for the control channel may be predefined. The RS bundling size, which is configured by the gNB or is predefined, may be set to any one of 1, 2, and 3.

The RS bundling size of the control channel may be limitedly configured to be equal to an RS bundling size of a data region. The RS bundling size and/or application or non-application of RS bundling on the control channel may be equally or differently configured by the gNB for the UE through higher layer signaling and/or physical layer signaling, according to a subframe type (e.g., whether a subframe is an MBSFN subframe or a non-MB SFN subframe or whether a subframe is a normal subframe or a special subframe), TDD or FDD, an RB set, a transmission method type (e.g., whether the transmission method type is CRS-based control channel RB set transmission or DMRS-based control channel RB set transmission), and/or localized or distributed arrangement of an RB set.

In addition to the above-described method, the UE may report, to the gNB, preference or non-preference thereof for application or non-application of RS bundling or the RS bundling size or capabilities of the UE related to application or non-application of RS bundling or the RS bundling size and the gNB may use the same.

When data is decoded, a DMRS of the control channel may also be used for channel estimation for decoding data information. For example, when the bundling size of a data channel is greater than the bundling size of the control channel, control information may be transmitted between the data. In this case, an RS which has been used to decode the control information may also be used to decode the data information. This may be equally applied to the case in which the control channel is multiplexed together in a bundling unit of the data channel.

In the present disclosure, the term sTTI may be extensively interpreted as a TTI configured to be shorter or longer than a predefined length such as 1 ms or as a TTI consisting of more or fewer symbols than 14 symbols in a normal CP. The predefined length may correspond to a specific TTI length and the sDCI may correspond to control information corresponding to the sTTI.

When the gNB configures an sPDCCH RB set, partial resources may be wasted without being used according to the size of the RB set. For example, an LTE sTTI system may be configured as illustrated in FIG. 10 according to a configuration of a control RB set.

A description will be given in detail with reference to FIG. 10. When a CRS-based sPDCCH RB set is configured as two symbols, 9 RBs, and localized mapping, then two RBs in the second symbol are not used as illustrated in FIG. 10(a). When the CRS-based sPDCCH RB set is configured as two symbols, 10 RBs, and distributed mapping, then RB numbers 8, 9, 18, and 19 are not used as illustrated in FIG. 10(b). That is, when the CRS-based sPDCCH RB set is as illustrated in FIGS. 10(a) and 10(b), resources may be unnecessarily wasted and resources which may be used by other UEs such as legacy UEs may be restricted.

Accordingly, upon allocating the CRS-based sPDCCH RB set, the gNB may configure RBs such that there is no RB unused in a corresponding control RB set in consideration of the number of sREGs per sCCE. Specifically, when an sCCE consists of A sREGs, the gNB may limitedly configure control RB sets such that (number of symbols x number of RBs) or (number of symbols x number of resource block groups (RBGs)) of the RB set is a multiple of A. Alternatively, the number of RBs or the number of RBGs of the sPDCCH RB set may be limitedly configured always as a multiple of A on the frequency axis.

Figure 11:
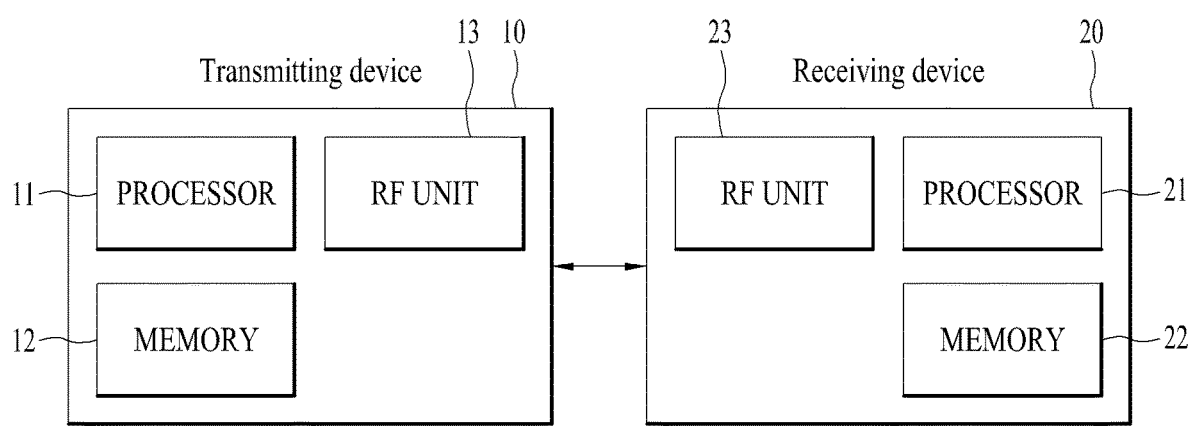
FIG. 11 is a diagram illustrating components of a transmitting device 10 and a receiving device 20 for implementing the present disclosure.

FIG. 11 is a block diagram of a transmitting device 10 and a receiving device 20 configured to implement exemplary embodiments of the present disclosure.

Referring to FIG. 11, the transmitting device 10 and the receiving device 20 respectively include RF unit 13 and 23 for transmitting and receiving radio signals carrying information, data, signals, and/or messages, memories 12 and 22 for storing information related to communication in a wireless communication system, and processors 11 and 21 connected operationally to the RF unit 13 and 23 and the memories 12 and 22 and configured to control the memories 12 and 22 and/or the RF unit 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF unit 13 and 23 include one or more antennas. An antenna performs a function of transmitting signals processed by the RF unit 13 and 23 to the exterior or receiving radio signals from the exterior to transfer the radio signals to the RF unit 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In the present disclosure, the RF units 13 and 23 may support reception BF and transmission BF. For example, the RF units 13 and 23 may be configured to perform the functions described above with reference to FIGS. 5 to 8. In addition, each of the RF units 13 and 23 may be referred to as a transceiver.

In embodiments of the present disclosure, a UE operates as the transmitting device 10 on UL and as the receiving device 20 on DL. In embodiments of the present disclosure, a gNB operates as the receiving device 20 on UL and as the transmitting device 10 on DL. Hereinafter, a processor, an RF unit, and a memory provided in the UE are referred to as a UE processor, a UE RF unit, and a UE memory, respectively, and a processor, an RF unit, and a memory provided in the gNB are referred to as a gNB processor, a gNB RF unit, and a gNB memory, respectively.

The gNB processor of the present disclosure transmits a PDCCH to the UE. In this case, the gNB may perform control to transmit the PDCCH through any one of PDCCH candidates for the UE. The gNB processor may perform control to transmit parameter information for causing the UE to acquire CCE indexes corresponding to the candidate PDCCHs and duration information about a duration in which a configuration related to the parameter information is maintained to the UE. The gNB processor may directly indicate a $Y_k$ value as the parameter information and may indicate $Y_{-1}$ to cause the UE to calculate the $Y_k$ value in a duration unit. The duration unit may be a TTI unit which is a reference to transmit the PDCCH. The gNB processor may additionally indicate, to the UE, a value corresponding to the number of a plurality of UEs so that the same starting CCE index may be configured for the plural UEs. The UE may calculate the starting CCE index based on the value corresponding to the number of the plural UEs.

When the gNB processor transmits an sPDCCH and the PDCCH based on two different TTIs, the positions of candidate sPDCCHs and the positions of candidate PDCCHs may be different. In this case, the gNB processor may perform control to configure an offset value indicating an interval between the positions of the candidate sPDCCHs and the positions of the candidate PDCCHs for the UE.

The gNB processor may configure application or non-application of RS bundling and an RS bundling size for the UE. The gNB processor may perform control to equally configure an RS bundling size for the PDCCH and an RS bundling size for a PDSCH.

The UE processor of the present disclosure controls the transceiver to receive the parameter information for acquiring the CCE indexes corresponding to the candidate PDCCHs and the duration information about the duration in which the configuration related to the parameter information is maintained from the gNB. The UE processor acquires the CCE indexes using same parameter based on the parameter information during a duration corresponding to the duration information and receives the PDCCH by monitoring the candidate PDCCHs.

The parameter information may be any one of $Y_k$ and $Y_{-1}$. Upon receiving $Y_k$, the UE processor acquires the CCE indexes by equally applying the received $Y_k$ value during the duration and, upon receiving $Y_{-1}$, the UE processor calculates $Y_k$ values during the duration and equally applies the first acquired $Y_k$ to calculate the CCE indexes.

That is, when the duration is 5, values from $Y_0$ to $Y_4$ are calculated. The CCE indexes are acquired using only the $Y_0$ value during a duration from $Y_0$ to $Y_4$. A unit of the duration may depend on a TTI unit in which the PDCCH is transmitted. Upon receiving information about the number of UEs for which the same starting CCE index is configured, the UE processor may calculate the $Y_k$ value again by performing a modulo operation using a value corresponding to the number of the UEs on the already acquired $Y_k$ value.

Upon receiving the sPDCCH and the PDCCH having different TTIs, the UE processor may control the transceiver to receive the offset value indicating the interval between the positions of the candidate sPDCCHs and the positions of the candidate PDCCHs and may be aware of the positions of the candidate sPDCCHs based on the received offset value.

The UE processor may control the transceiver to receive application or non-application of RS bundling for the PDCCH and a bundling size from the gNB. In this case, the RS bundling size for the PDCCH may be configured to be the same as the RS bundling size for the PDSCH.

The gNB processor or the UE processor of the present disclosure may be configured to apply the present disclosure on a cell operating in a high frequency band above 6 GHz or more in which analog or hybrid beamforming is used.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

INDUSTRIAL APPLICABILITY

While the method of receiving a DL control channel and the apparatus therefor have been described based on an example applied to a 5G New RAT system, the method and apparatus are applicable to various wireless communication systems in addition to the 5G New RAT system.

The invention claimed is:

1. A method of receiving a physical downlink control channel (PDCCH) by a user equipment (UE) in a wireless communication system, the method comprising:
  receiving (i) first information related to a variable $Y_{-1}$ for acquiring control channel element (CCE) indexes of candidate PDCCHs and (ii) second information related to a value m, where m is an integer;
  acquiring a variable $Y_n$ based on applying the variable $Y_{-1}$ to a first equation, where n is an integer;
  acquiring the CCE indexes for variables from the variable $Y_n$ to a variable $Y_{n+m}$, based on applying $Y_n$ to a second equation; and
  receiving the PDCCH by monitoring the candidate PDCCHs based on the CCE indexes,
  wherein the CCE indexes for the variables from the variable $Y_n$ to the variable $Y_{n+m}$ are acquired based on maintaining the variable $Y_n$ in the second equation.

2. The method of claim 1, wherein the value m is based on a transmission time interval (TTI) unit for receiving the PDCCH.

3. The method of claim 1, wherein the value m is based on a number of UEs for which the same starting CCE index is configured.

4. The method of claim 1, wherein, based on the PDCCH being received in a first transmission time interval (TTI), an interval for an offset configured by a base station (BS) is present between the candidate PDCCH for the PDCCH and a candidate PDCCH for a second TTI longer than the first TTI.

5. The method of claim 1, the method further comprising:
  configuring a reference signal bundling size for the PDCCH,
  wherein the reference signal bundling size for the PDCCH is equal to a reference signal bundling size for a physical downlink shared channel (PDSCH).

6. A user equipment (UE) for receiving a physical downlink control channel (PDCCH) in a wireless communication system, the UE comprising:
  a transceiver configured to transmit and receive signals to and from a base station (BS); and
  a processor configured to control the transceiver,
  wherein the processor is configured to:
  control the transceiver to receive (i) first information related to a variable $Y_{-1}$ for acquiring control channel element (CCE) indexes of candidate PDCCHs and (ii) second information related to a value m, where m is an integer;
  acquire a variable $Y_n$ based on applying the variable $Y_{-1}$ to a first equation, where n is an integer;
  acquire the CCE indexes for variables from the variable $Y_n$ to a variable $Y_{n+m}$ based on applying $Y_n$ to a second equation; and
  control the transceiver to receive the PDCCH by monitoring the candidate PDCCHs based on the CCE indexes,
  wherein the CCE indexes for the variables from the variable $Y_n$ to the variable $Y_{n+m}$ are acquired based on maintaining the variable $Y_n$ in the second equation.

7. The UE of claim 6, wherein the value m is based on a transmission time interval (TTI) unit for receiving the PDCCH.

8. The UE of claim 6, wherein the value m is based on a number of UEs for which the same starting CCE index is configured.

9. The UE of claim 6, wherein, based on the PDCCH being received in a first transmission time interval (TTI), an interval for an offset configured by a base station (BS) is present between the candidate PDCCH for the PDCCH and a candidate PDCCH for a second TTI longer than the first TTI.

* * * * *